(12) United States Patent
Roizen et al.

(10) Patent No.: US 8,428,948 B1
(45) Date of Patent: Apr. 23, 2013

(54) USAGE BASED QUERY RESPONSE

(75) Inventors: Igor Roizen, Los Angeles, CA (US);
Wojciech Jawor, Los Angeles, CA (US);
Keith Dutton, Santa Barbara, CA (US)

(73) Assignee: Shopzilla, Inc., Los Angeles, CA (US)

( * ) Notice: Subject to any disclaimer, the term of this patent is extended or adjusted under 35 U.S.C. 154(b) by 378 days.

(21) Appl. No.: 12/839,764

(22) Filed: Jul. 20, 2010

Related U.S. Application Data

(63) Continuation of application No. 12/640,964, filed on Dec. 17, 2009.

(51) Int. Cl.
*G10L 15/04* (2006.01)

(52) U.S. Cl.
USPC ............................ 704/251; 704/9; 704/257

(58) Field of Classification Search ............... 704/1–10, 704/231, 235, 251, 255, 257, 270, 277, 270.1
See application file for complete search history.

(56) References Cited

U.S. PATENT DOCUMENTS

| | | | |
|---|---|---|---|
| 5,544,360 A | 8/1996 | Lewak et al. | |
| 5,680,628 A | 10/1997 | Carus et al. | |
| 5,832,480 A | 11/1998 | Byrd, Jr. et al. | |
| 5,878,386 A * | 3/1999 | Coughlin | 704/10 |
| 6,317,741 B1 | 11/2001 | Burrows | |
| 6,816,830 B1 | 11/2004 | Kempe | |
| 7,092,871 B2 | 8/2006 | Pentheroudakis et al. | |
| 7,146,361 B2 | 12/2006 | Broder et al. | |
| 7,149,735 B2 | 12/2006 | Chaudhuri et al. | |
| 7,152,065 B2 | 12/2006 | Behrens et al. | |
| 7,406,456 B2 | 7/2008 | Calistri et al. | |
| 7,493,293 B2 | 2/2009 | Kanungo et al. | |
| 7,716,199 B2 | 5/2010 | Guha | |
| 7,725,307 B2 * | 5/2010 | Bennett | 704/9 |
| 7,783,476 B2 | 8/2010 | Yang | |
| 2005/0210003 A1 | 9/2005 | Tsay et al. | |
| 2007/0112556 A1 | 5/2007 | Lavi et al. | |
| 2007/0156678 A1 | 7/2007 | Ashkenazi et al. | |
| 2008/0033939 A1 | 2/2008 | Khandelwal | |
| 2008/0071533 A1 | 3/2008 | Cave et al. | |
| 2008/0109416 A1 | 5/2008 | Williams | |
| 2008/0162520 A1 | 7/2008 | Sarwar et al. | |
| 2008/0201133 A1 | 8/2008 | Cave et al. | |
| 2009/0089277 A1 | 4/2009 | Cheslow | |

* cited by examiner

*Primary Examiner* — Huyen X. Vo
(74) *Attorney, Agent, or Firm* — Frost Brown Todd LLC

(57) ABSTRACT

It is possible to provide meaningful responses to queries using systems which consider usage of words in the queries when analyzing those queries and determining what information is possibly relevant. This approach can be applied in online shopping systems by identification of nouns or noun phrases reflecting products available through the system.

15 Claims, 8 Drawing Sheets

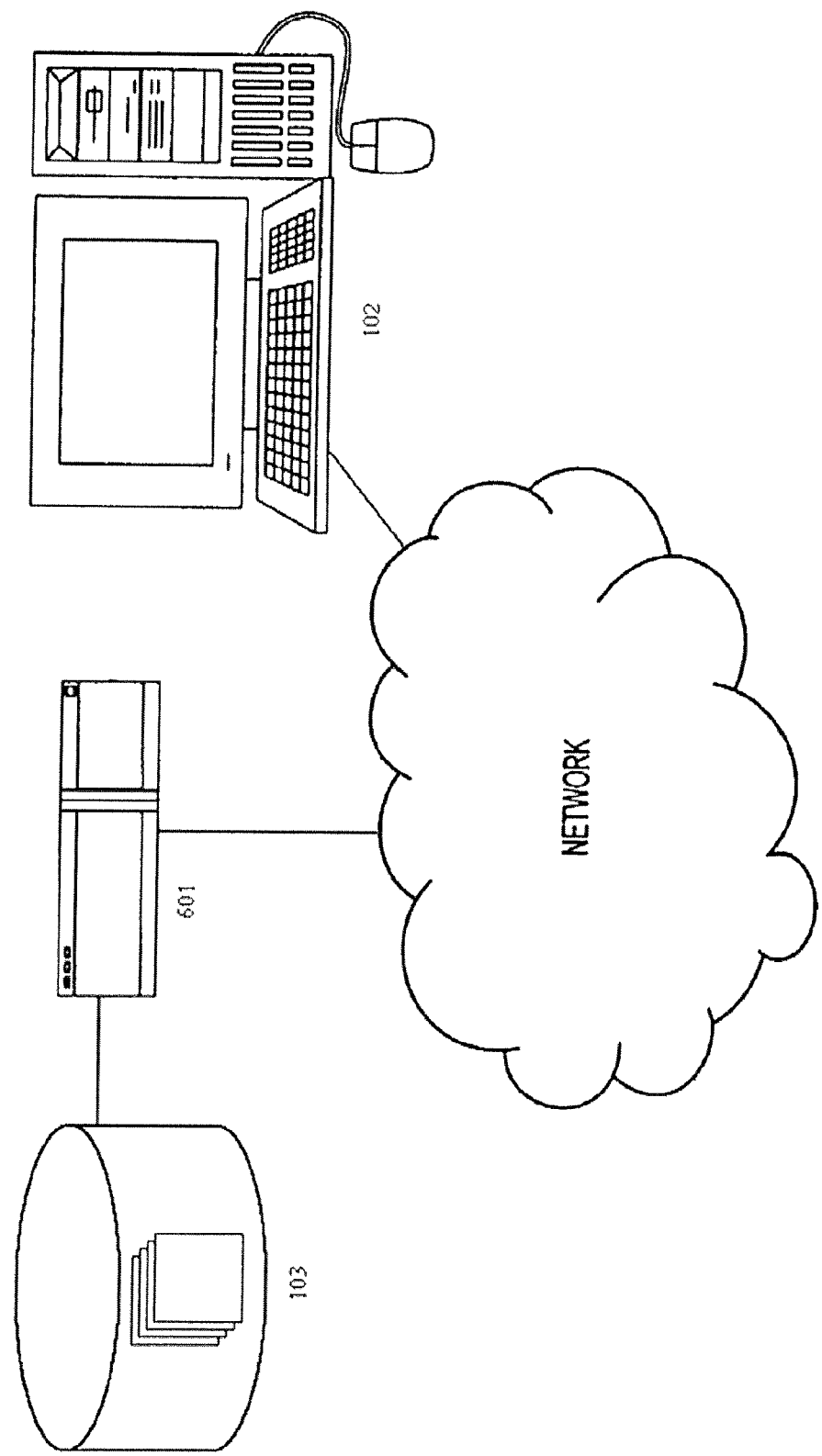

New Keyword criteria:

| | | |
|---|---|---|
| Keyword: | [                    ] ←901 | |
| Plural: | [                    ] | |
| Atom: | [                    ] lookup | |
| Country code: | [US ˅]  ↑ 902 | |
| Status: | [Active ˅] | |
| Review status: | [Reviewed ˅] | |
| Comments: | [                    ] | |

903→ [ Add new keyword ]

Figure 8

USAGE BASED QUERY RESPONSE

CROSS REFERENCE TO RELATED APPLICATIONS

This non-provisional patent application is a continuation of, and claims the benefit of, U.S. non-provisional patent application Ser. No. 12/640,964, entitled "Usage Based Query Response," filed on Dec. 17, 2009.

FIELD

Aspects of this disclosure can be implemented in computerized systems which respond to queries, and can be particularly applied in systems which match user queries to sets of documents.

BACKGROUND

Providing meaningful responses to queries is a difficult task. This is especially true in cases such as search engines where queries are typically quite brief (for example, a single word), and provide little or no context from which the desired subject matter for a query can be deduced. One way to try to address this problem is to allow the use of formal syntax, such as Boolean logic, so that queries can be specified more precisely. However, in many cases information retrieval tools will be operated by individuals who are not comfortable or familiar with Boolean logic or other specialized syntaxes, so providing support for those syntaxes is, at best, a partial solution. Further, even when a user is able to use an appropriate syntax to specify a query, whether the response to the query is meaningful depends both on the user's ability to accurately translate his or her goal into the proper syntax, and on the relationship of that syntax to the information corpus from which the response is drawn. Accordingly, there is a need for improvements in the technology used to provide responses to queries.

SUMMARY

Tools for providing responses to queries can be improved by using information on word usage to determine the underlying subject matter of a query. An approach to achieving this in the context of an online shopping system is to focus on an invented part of speech associated with products that can be used to at least partially distinguish one product from another ("product nouns"). When a query is received by such a system, it could be analyzed to identify product nouns, and then matched against relevant products using data structures prepared in advance. The relevant products could then be ranked, and provided to the user in response to his or her query.

BRIEF DESCRIPTION OF THE DRAWINGS

FIG. 6 depicts an architecture which could be used to implement certain teachings of this disclosure.

FIG. 8 depicts an interface which could be used to support certain functionality in systems which implement certain aspects of this disclosure.

DETAILED DESCRIPTION

Figure 1:
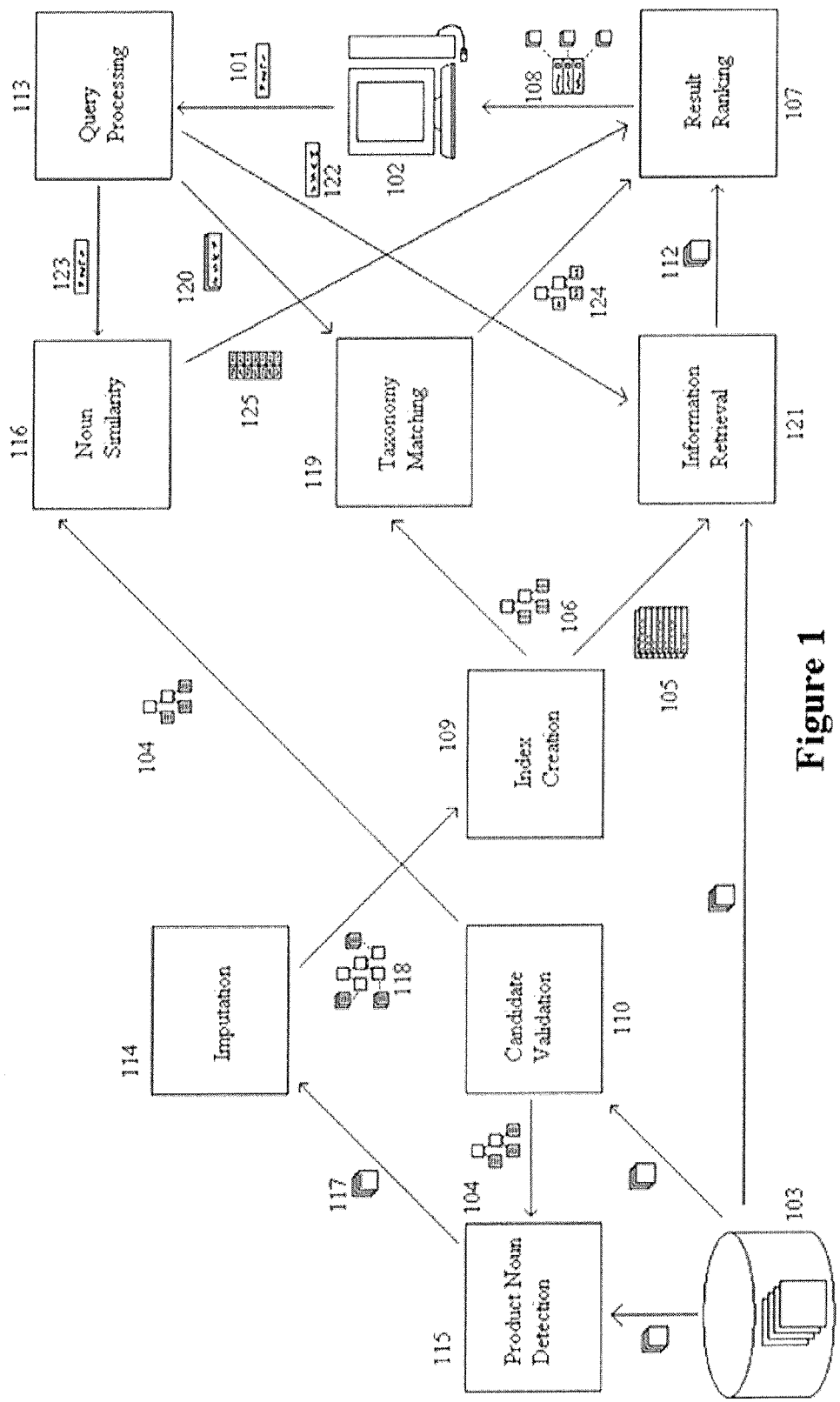
FIG. 1 depicts an architecture which could be used to implement certain teachings of this disclosure.

To provide context for understanding the inventors' technology, this disclosure is built around explaining how an online shopping system could be implemented using an architecture such as illustrated in FIG. 1. In such an online shopping system, to make a purchase, a user would enter a query [101] into an interface presented by the user's computer [102]. That query [101] would be matched against information in a database [103] using data structures (e.g., a list of product nouns [104], an optimized index [105], and a class probability index [106]) which had been prepared in advance. Potentially relevant information [112] could then be retrieved from the database [103]. This information [112] would be subjected to a result ranking process [107] to produce a response [108] which would be communicated through the user's computer [102]. In most cases, the time between the user entering a query [101] and being sent a response [108] (referred to as "query time") will be on the order of milliseconds. By contrast, the time necessary for the work done in advance (referred to as "build time") could be on the order of hours or days. In this disclosure, both the tasks which take place at build time (e.g., index creation [109], and candidate validation [110]), and the tasks that take place at query time (e.g., result ranking [107], query processing [111]), are discussed in detail.

Turning first to query time, after a query [101] is sent by the user's computer, an online shopping system could perform one or more types of query processing [113]. In implementations which utilize product nouns to help determine the response [108], the query processing [113] can include identifying product nouns in the user query [101]. As an illustration of how this identification can take place, the following disclosure focuses on a Markov model approach to identifying product nouns in queries. However, it should be understood that tools other than Markov models, such as neural networks, decision trees, and grammars, could also be used in identifying product nouns in queries. Further, it should also be understood that query processing [113] is not limited to the identification of product nouns. For example, in some implementations, query processing [113] might also include tasks such as spell checking, substitution of synonyms, stemming, or other tasks such as might be useful or necessary in a particular situation. Accordingly, the discussion below of the application of Markov models should be understood as being illustrative only, and not limiting.

Turning now to the use of a Markov model to identify product nouns, in this approach, the query [101] is treated as being made up of a series of parts of speech (e.g., <adjective><noun><product noun>), each of which has some likelihood of being followed by another (e.g., there could be a 10% probability that <adjective> will be followed by <product noun>—its "transition probability"). While the parts of speech are not directly provided by the query [101], they are reflected in the query's actual words, with each part of speech having a certain probability of being reflected by a given word (e.g., <adjective> could have a 1% probability of being reflected by the word "pressurized"—its "emission probability"). Given a set of emission and transition probabilities, a variety of algorithms exist in the art which can be used to determine parts of speech (including product nouns) for the query [101]. For example, the Viterbi algorithm can be used to find the sequence of parts speech which is most likely to have been reflected in the words of a query, as well as that sequence's probability. To illustrate, for the query "pressurized tennis balls," the Viterbi algorithm could indicate that the most probable sequence for that query is <adjective><adjective><product noun>, and that the sequence has a probability of 50%.

While known algorithms can be used in a Markov model approach, such algorithms are often implemented with assumptions that may not be appropriate for the detection of product nouns. For example, standard approaches often assume that the probability of moving from one part of speech to another depends only on the first part of speech (the "Markov assumption"). In some implementations, this assumption might be broken to make the system more efficient at identifying product nouns. As an example, there could be a rule which states that it is unlikely that a query will contain more than one product noun, as a user is unlikely to search for more than one product at a time. In a system which includes such a rule, the algorithms used to identify parts of speech could be configured to downgrade the probabilities for sequences which include more than one product noun (e.g., in the Viterbi algorithm, a flag could be used to track whether a product noun had already been identified in a sequence and, if it had, the transition probability for subsequent transitions to <product noun> could be decreased). As a second example of how the Markov assumption could be broken, in some implementations there could be a rule which states that a product noun is more likely to appear at the end of a query. In such a case, the algorithms which identify product nouns could maintain some state information indicating a word's position in a query, and increase the transition probability of <product noun> closer to the end of the query.

Figure 2:
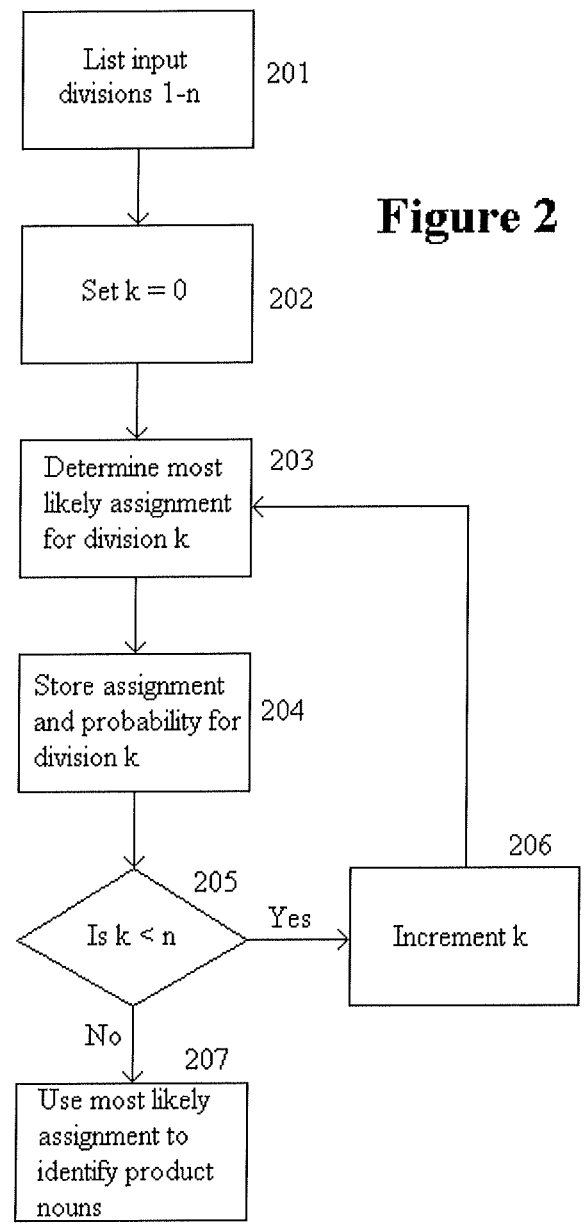
FIG. 2 depicts a process which could be used to identify parts of speech which could be made up of one or more words.

Other variations on standard approaches beyond those which break the Markov assumption are also possible. As an example of a variation which could be implemented without breaking the Markov assumption, consider the process depicted in FIG. 2. FIG. 2 depicts a variation which could be implemented to account for the fact that a product noun (or other part of speech, such as a brand) could be made up of more than one word. In the process of FIG. 2, identification of a product noun begins by listing (e.g., by enumerating and storing in a table or array) the ways of dividing the input [201]. As an illustration, in the case of the input "pressurized tennis balls," the first step of FIG. 2 could be performed by listing each possible division for each possible length of product noun, and storing the divisions in an array or other data structure such as shown in table 1.

TABLE 1

| Data Element | Array Index |
| --- | --- |
| "pressurized", "tennis", "balls" | 0 |
| "pressurized tennis", "balls" | 1 |
| "pressurized", "tennis balls" | 2 |
| "pressurized tennis balls" | 3 |

Once the listing of divisions [201] is complete, a counter (identified as variable k in FIG. 2) could be initialized [202], and the process could proceed to determine the most likely assignment for the $k^{th}$ (initially $0^{th}$) division [203]. Once the most likely assignment for that division had been determined [203], it could be stored [204] along with its associated probability. A test [205] could then be performed to determine if an assignment had been made for each of the possible divisions. If one or more of the divisions still hadn't had an assignment made, then the counter could be incremented [206], and the process could be repeated for the next division on the list [203]. Otherwise, the probability for the stored assignments could be compared, and the most likely assignment could be used to identify the product noun [207].

As a complement to identification of product nouns during query processing [113], some implementations might also support build time identification of product nouns in information used to provide responses to those queries. While the specific information used to respond to queries could vary between implementations, for the purpose of illustration, this disclosure focuses on a case where the responsive information is drawn from offers for products provided by third party merchants. These offers will generally include a title identifying the product being offered, a more detailed description setting forth information the merchant believes may be of interest to a potential purchaser, a price, and an indicator of where the offer's underlying product can be purchased (e.g., a URL for the third party merchant's website). In the architecture of FIG. 1, there are three processes which would be involved associating those offers with product nouns: candidate validation [110], imputation [114], and product noun detection [115]. To illustrate, the following disclosure discusses how each of those processes could operate independently, then provides some examples of how they could be combined into a system such as depicted in FIG. 1.

In candidate validation [110], individual offers are analyzed, and portions of those offers which fit given criteria as product nouns are then subjected to validation and approved. As an illustration of how the analysis might take place, in some implementations a candidate validation process [110] could begin by retrieving offers from the database [103], then applying rules, such as described below in table 2, which would remove portions of the offers which should not be considered candidates for validation.

TABLE 2

| Rule | Description |
| --- | --- |
| Portion remover | Rules which remove portions of the offer which contain information which is of the wrong type or not susceptible to analysis. For example, a rule could strip offers of everything except their titles, based on the assumption that a merchant would be likely to choose a title which is descriptive of the underlying product and includes appropriate nouns. |
| Clause remover | Rules which recognize and remove clauses in offers (or portions of offers, in the event that an offer has been partially scrubbed before application of the clause remover). Clause removers can include rules that recognize clauses which describe a product which is different from, but associated with, the product being sold (e.g., a requirements clause starting with a phrase such as "usable with"), and rules which recognize and remove subordinate clauses in compound sentences. |
| String remover | Rules which identify portions of an offer which match strings that are identified as not being product nouns in some pre-existing resource. For example, a string remover could use an English dictionary to identify a word as having a non-noun part of speech (e.g., a verb or an article), then remove that word from the offer. Similarly, an idiom dictionary could be used to identify words which, while they may qualify as nouns in a general purpose English dictionary, are unlikely to identify an underlying product based on their context (e.g., the phrase "cost an arm and a leg" could be recognized and removed, even |

TABLE 2-continued

| Rule | Description |
|------|-------------|
|      | though both the words "arm" and "leg" are nouns in the English language). |

Variations are also possible. For example, in some implementations, it is possible that a formal grammar could be applied to determine if portions of an offer form syntactically valid strings in a "language" representing subject matter other than a product noun. For instance, a grammar could be created from a set of rules which identify a string as belonging to the "size or measurement" language (e.g., is the string made up of a number followed by a unit of measurement, is the string a gender followed by small, medium or large, etc). When a portion of the offer was identified as belonging to that "language" that portion could be removed. As another potential variation, in some implementations rules could be applied differently to different offers. For example, in many cases, online shopping systems maintain the offers they can provide to users in a state where the offers are classified according to some kind of taxonomy. In such cases, the location of an offer in the taxonomy can be used to determine how rules are applied (e.g., if an offer is categorized as an offer for a pharmaceutical product, then a rule could be applied which recognizes and removes pharmaceutical specific idioms, such as "over the counter" or "prescription strength").

Of course, potential functions for analyzing offers are not limited to the removal of offer portions as described. For instance, in some implementations, the analysis could include functions which rebuild offers by replacing one or more words that had been removed previously. Such rebuilding functions could be implemented in a variety of ways. For example, if there were a rule that any word in an offer which was not an English language noun should be removed, a rebuilding function could implement an exception to that rule which states that words which appear as part of a brand (e.g., "red" in the context of "red bull" for an energy drink) should not be removed separately from the rest of the words in the brand. As another example, some rebuilding functions might consider statistics, such as by evaluating whether a removed word co-occurs with a potential product noun with a great enough frequency (e.g., co-occurrence frequency more than one standard deviation greater than average) to indicate that the two words should be treated together as a single potential product noun. Depending on the implementation, this evaluation could be performed iteratively for each word which is adjacent to the potential product noun until the rebuilding function hits on a word which does not satisfy the co-occurrence requirement, or until there are no further words to be considered. Other variations are also possible, and will be apparent to those of ordinary skill in the art in light of this disclosure. For example, in some implementations, identifying candidate product nouns could take place in a single step, such as by applying Markov model analysis to the offers (or parts of offers, such as their titles). There could also be additional steps, such as applying spelling and syntax checkers to an offer before identifying candidate product nouns.

Once the candidate product nouns have been identified, those candidates would be subjected to validation before being accepted as being product nouns for their underlying offers. This validation could be performed in a variety of ways. For example, validation could be performed by applying one or more fundamental rules to the candidate product nouns (e.g., that the candidate product noun must be a noun or a noun phrase), and rejecting candidate product nouns which do not satisfy those rules. Validation could also include functions which identify and reject candidate product nouns which do not reflect the substance of their underlying offer. As an example of how this might take place, there could be a rule which rejects any candidate noun which is not unambiguously part of the same class as the offer from which it was derived. Thus, if a candidate product noun derived from an offer in a first class could also match an offer in a different class, the candidate product noun could be rejected as failing the unambiguous classification requirement (e.g., a candidate product noun of "ball" for an offer in the class "Tennis Balls" could be rejected because "ball" could also match an offer in the class "Soccer Balls"). As another example, a validation function could make use of historical information about user queries by implementing a rule requiring that product noun candidates be reflected in at least some portion of the queries made by users of the system (e.g., the candidate product noun must have appeared in a user query some time in the previous 30 days, must have appeared some time in the last million queries, etc). Once a candidate product noun had passed all of the requirements (whatever they might be in a particular implementation), it would be approved and associated with the offer (or offers, in the case where a candidate product noun is found in multiple offers) from which it was derived.

Of course, the above description should not be treated as implying limits on the activities which could be performed during validation in the candidate validation process [110]. As an example of another potential type of activity which could take place, consider an implementation which manipulates candidate product nouns during validation. Such manipulation might include making a product noun as short as possible (but no shorter), based on the theory that the shorter a product noun is, the more likely it will match a user query (it has been observed that user queries are generally on the order of 3 words long, while offer titles are often 10-15 words long, and offer descriptions can extend to a paragraph or more). To illustrate, in a case where the candidate product noun "pressurized tennis balls" is derived from an offer from the category "sports equipment\tennis equipment," the token "pressurized tennis balls" could be reduced to "tennis balls" before being validated, since "tennis balls" is still in the class of "tennis equipment," while "balls" would fall into the more generic class of "sports equipment" (e.g., as shown by the fact that there might be offers for "soccer balls" in a different subclass of the sports equipment class).

Other types of modification (e.g., replacing words in a candidate product noun with synonyms encountered in user queries or a thesaurus) could also be performed, or other types of activities could be included in validation. Similarly, in some implementations, portions of offers which are not validated as product nouns could be used as well. For example, there could be implementations in which not only a product noun, but also noun phrases within the product noun could be associated with an offer (e.g., if a product noun for an offer was identified as "pressurized tennis balls", then that product noun, along with "tennis balls" and "balls" could be associated with the offer). Portions of candidate product nouns which are not part of the product noun which is ultimately associated with an offer could also be used. For example, a candidate product noun which is rejected during validation could be added to a list of non-product noun strings which would be recognized and removed during future iterations of candidate generation. Accordingly, the discussion of activities which could take place during validation of candidate product nouns should be understood as being illustrative only, and not limiting.

Different implementations of candidate validation [110] could also vary in the number or types of steps performed during that process, in addition to varying in the way individual steps are performed. For example, consider FIG. 7, which shows additional activities which could be performed during candidate validation [110] in instances where validation of candidate product nouns is performed in whole or in part using human validators. Initially, in the process of FIG. 7, a subset of offers would be selected for candidate validation [701]. This selection [701] could take place in a variety of manners. For example, some systems might be implemented so that candidate validation [110] is performed on a class by class basis (e.g., processing would start with the offers from the first terminal node in a taxonomy used to organize offers, then move to the offers from the second terminal node, and continue in that manner until the offers from each of the terminal nodes had been processed). Alternatively, some systems might be implemented so that candidate validation [110] is performed on a last in first out basis (e.g., processing could start with the 10,000 offers which were most recently added to the database, and continue in batches of 10,000 until all offers had been processed), or according to some other ordering scheme (e.g., first in first out, batches based on revenue, batches based on frequency in user queries, etc). The particular scheme used for selecting a subset of offers [701] in implementations where that step is performed will vary based on the requirements and resources present in a particular scenario. For example, in a case where there is a desire to use human validators, subset selection [701] based on classes might be appropriate, since humans might have knowledge of the subject matters of particular classes, and might be able to increase their efficiency by learning about a class as it is processed. Combinations are also possible. For example, candidate validation [110] could initially be performed on a class by class basis, then could subsequently be performed on a last in first out basis for maintenance and updates. Additional variations are contemplated by the inventors and will be immediately apparent to those of ordinary skill in the art in light of this disclosure. Accordingly, the discussion above should be understood as illustrative only, and not limiting.

Figure 7:
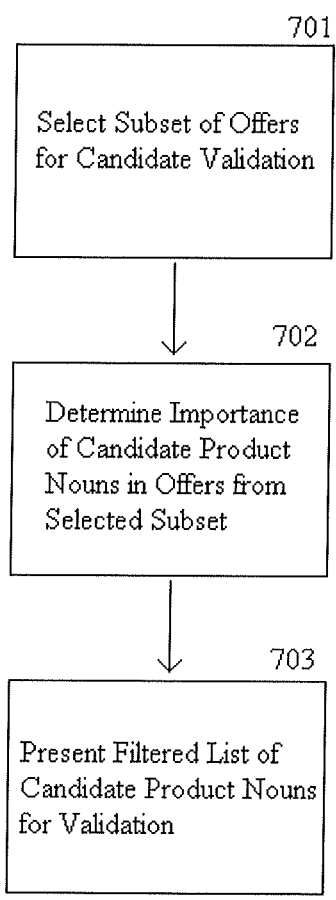
FIG. 7 depicts steps which can be used in processing data which can be used to provide responses to queries.

Moving now to the second step depicted in FIG. 7, determining the importance of candidate product nouns in offers from the selected subset [702], that step can be performed during candidate validation [110] after some level of processing (e.g., cleaning and rebuilding offers to identify candidate product nouns) has taken place. For example, the determining importance step [702] could comprise examining the candidate product nouns determined by application of cleaning and rebuilding rules such as described previously, and identifying the candidate product nouns which are present in some threshold portion (e.g., 80%) of the underlying offers. Those candidate product nouns which were present in the threshold portion could then be specified as "important", while others could be considered "not important" (e.g., if there were 10 offers in the selected subset, 5 of which contained candidate product noun W, 3 of which contained candidate product noun X, 2 of which contained candidate product noun Y, and one of which contained candidate product noun Z, then candidate product nouns W and X would be considered "important" and candidate product nouns Y and Z would be considered "not important"). Alternatively, importance could be determined based on criteria other than frequency. For example, in some implementations, the determining importance step [702] could be performed by examining revenue associated with the candidate product nouns in the subset of offers being processed, wherein the candidate product nouns associated with some threshold amount of revenue (e.g., 80% of the revenue generated by offers in the subset) would be considered "important," with the remainder being considered "not important." Combined approaches are also possible. For example, in some implementations which use multiple criteria in the determining importance step [702], a candidate product noun could be considered "important" if it met the importance threshold for any (or all, or some number) of the underlying criteria. Alternatively, rather than simply using each criteria to make a binary "important"/"not important" determination, the criteria could be used to derive importance scores (e.g., importance score for a revenue criteria could be the revenue percentage associated with a particular product noun), and then those scores would be combined (e.g., by an average, or weighted average) and only the top candidate product nouns based on the composite score would be deemed "important."

Once the determining importance step [702] had taken place, the process shown in FIG. 7 could move to the step of presenting a filtered list of candidate product nouns for validation [703]. This step could be as simple as presenting a list of the candidate product nouns that had been deemed "important" to a human validator, and requesting that the validator either approve or reject each in turn. Alternatively, in a case where there are multiple validators, the list could be broken up, and a portion of the list would be assigned to each of the validators. There could also be alternatives where the same candidate product noun would be presented to multiple validators, and would be considered to be validated if it was approved by a certain percentage of the validators (e.g., 50%). Similarly, the presentation step [703] could include presenting candidate product nouns through an interface which allows the human validators to do more than just approve or reject candidate product nouns. For example, there could be an interface which would allow validators to manipulate the candidate product nouns (e.g., by shortening them as described previously). Alternatively (or in addition), validators could be allowed to suggest new product nouns to search for in future processing which might not have been identified for any of the offers currently under examination. An example of an interface which would allow such suggestions of new product noun is shown in FIG. 8. Using an interface as shown in that figure, a validator could suggest a new product noun by adding the appropriate data into the depicted fields (e.g., by entering a product noun into the keyword field [901], and entering a location in a taxonomy which should be associated with that product noun into the atom field [902]) and hitting the add new keyword button [903]. Of course, various implementations could also provide support for other activities (e.g., searching for already existing product nouns) by human validators. Similarly, some implementations might include human validators but not perform the steps depicted in FIG. 7, or might perform steps such as depicted in FIG. 7 but not include human validators. Accordingly, the discussion above of both FIG. 7 and activities which could be performed by human validators should be understood as being illustrative only, and not limiting.

Figure 4:
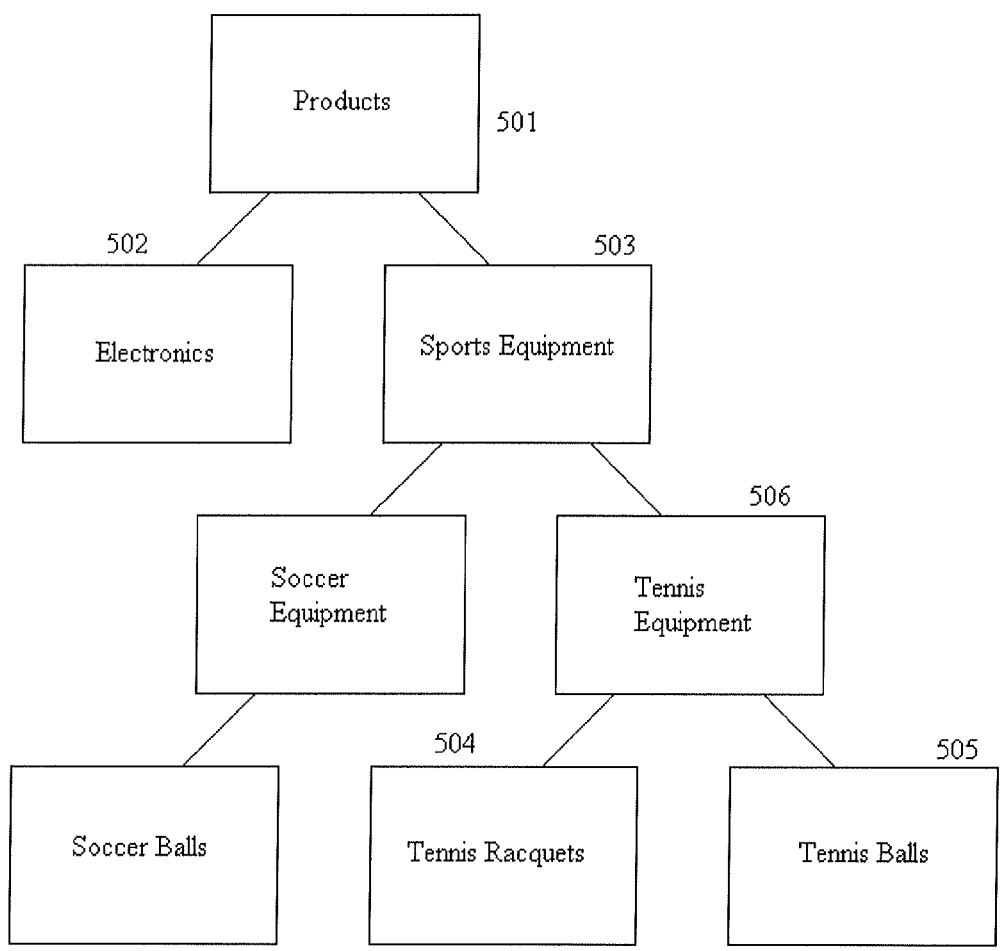
FIG. 4 depicts a taxonomy which could be used to organize information provided in response to queries.

In addition to candidate validation [110], the architecture of FIG. 1 also indicates that there could be an imputation process [114] used to determine associations between product nouns and offers. In the context of associating product nouns with offers, the imputation process [114] can operate to associate an offer with a product noun which is not necessarily present in the offer. One approach to imputation, that of associating an offer with one or more product nouns based on the offer's position in a taxonomy, is discussed below with respect to the taxonomy of FIG. 4. In the taxonomy of FIG. 4, the offers in the online shopping system's inventory are organized into subclasses of an overarching class for all products [501] which can be purchased via the online shopping system. The product class [501] is separated into subclasses to identify more specific product types (e.g., electronics [502] and sports equipment [503]). These subclasses are themselves separated into one or more levels of sub-subclasses until the taxonomy terminates with atomic nodes (e.g., tennis racquets [504] and tennis balls [505], under the sub-subclass tennis equipment [506]). The atomic nodes would then be associated with the online shopping system's offers (e.g., "pressurized tennis balls" would be associated with the node tennis balls [505]). While other types of taxonomies (e.g., taxonomies where child nodes might have multiple parents) could potentially be used in online shopping systems which incorporate various aspects of this disclosure, for the purpose of illustration, the relatively simple taxonomy of FIG. 4 is used herein as an exemplary organization.

One way to use a taxonomy such as shown in FIG. 4 in an imputation process [114] is to treat different titles given for the classes in that figure as product nouns, and impute them to the classes' constituent offers. To illustrate, an offer for "pressurized tennis balls" could be associated with product nouns "tennis balls," "tennis equipment," "sports equipment," and "products." Aliasing, such as by using synonyms, could also be included in some implementations. For example, in a taxonomy which includes the class "refrigerator," offers under that class could be associated with the product noun "refrigerator" as well as the synonyms "fridge" and "ice box." Non-taxonomy based approaches are also possible. For instance, there could be a rule based imputation process [114], which could be configured with certain types of offers which should have product nouns imputed (e.g., an offer for a CanonSD750 should have the product noun "digital camera" imputed) based on the offers themselves, rather than based on their location in a taxonomy. Similarly, there could be a system which tracks the queries made by users who eventually selected an offer and imputes the product nouns from the user query into the selected offer.

Variations in imputation [114] are also possible. For example, in some implementations, in addition to forming associations, an imputation process [114] could generate data reflecting the strength of those associations. As an illustration of this, consider a case where strength data is generated based on the distance between an offer and a class title used for an imputation. In this type of case, the associations between an offer for "pressurized tennis balls" and the product nouns "tennis balls," "tennis equipment," "sports equipment," and products could be accompanied by strengths of 1, ½, ¼, and ⅛, to reflect distances between those class titles and the offer to which they were imputed in the taxonomy. Such strength data could be used in later processing (e.g., strength values could be used as weighting coefficients in query time calculations using imputed product nouns) or could be used during the imputation process itself (e.g., strength values could be used as a threshold, so only imputed product nouns having strengths above some baseline level would be passed on for query time processing).

The third process depicted in FIG. 1 used to associate product nouns with offers, product noun detection [115], can be implemented using techniques similar to those discussed with respect to query processing [113]. For example, product noun detection [115] could be performed by treating offer titles as being equivalent to user queries, and analyzing those titles using the same types of approaches described above. However, variations from the discussion of query processing are also possible. For example, in cases where offers are organized according to a taxonomy, product noun detection [115] might be implemented to make use of that organization to tailor processing to particular classes. For instance, a system could be implemented with multiple Markov models (or other types of tools) associated with various levels in the taxonomy used to organize offers. In such a case, the models used to process an offer during product noun detection [115] could be the models associated with the class in the taxonomy which is closest to the offer being analyzed (e.g., if an offer for an energy drink was being subjected to product noun detection [115], it could be analyzed with a specialized Markov model which could include rules, such as an emission rule stating that word "red" is likely to be used as part of a brand like "red bull", which might not be as appropriate for processing of offers outside the energy drink category). Similarly, in some implementations, product noun detection [115] might include rules to process offers which would not necessarily be appropriate in the case of queries. For example, in some cases, merchants will include information in offers that would be unlikely to be included in queries from users, such as a URL for the merchant web site, or a telephone number where a product could be purchased directly. To address these situations, rules, such as those described previously with respect to candidate validation [110], could be applied to offers before submitting them to product noun detection [115], thereby removing portions which should not be analyzed to identify product nouns.

Of course, other variations are also possible. For example, rather than using specialized Markov models or other tools to reflect the classification of offers, it is possible that some implementations could have a single overarching model (which could be the same model used in processing queries), and would use specific portions of that model depending on the classification of an offer being processed. As an illustration, consider a case of Markov model processing where transition probabilities between hidden states in the Markov model, instead of being represented by a single overarching probability (e.g., <adjective> has a 10% probability of being followed by <product noun>), are represented by sets of transition probabilities based on observations derived from different class data (e.g., <adjective> has a 10% probability of being followed by <product noun> based on that transition being present in $X_1/Y_1$ observations in class 1, in $X_2/Y_2$ observations in class 2, etc). In such a case, when an offer is processed during product noun detection [115], the analysis could proceed using only the subset of transition probability data which corresponds to the class associated with the offer, thereby taking advantage of the offer's classification information. Similar modifications could be made to the emission probabilities for specific words in offers. For example, there could be an implementation where each class has a different dictionary of words, and where each word in a dictionary is associated with a set of emission probability information showing the probability that it is used in a given way in the dictionary's class (e.g., word X has $Y_1$ probability of being used as an adjective, $Y_2$ probability of being used as a product noun, $Y_3$ probability of being used as a noun, etc). Alternatively, in some implementations the same emission probabilities might be used regardless of the class an offer is in, but the words considered during processing might be limited to those observed in the offer's class (e.g., a dictionary used for a board games class might have an entry for "chess king" as a <product noun>, but not as a <brand>, while a dictionary used for a vintage clothing class might have an entry for "chess king" as a <brand> but not as a <product noun>). Of course, how product noun detection [115] is implemented will vary from situation to situation, and different numbers or types of tasks, as well as different tools used to perform those tasks (e.g., Markov models, grammars, dictionaries, etc), might be included depending on how product noun detection [115] is incorporated into an overall system, and how that system is used. Accordingly, the discussion of product noun detection above should be understood as being illustrative only, and not limiting.

Figure 3:
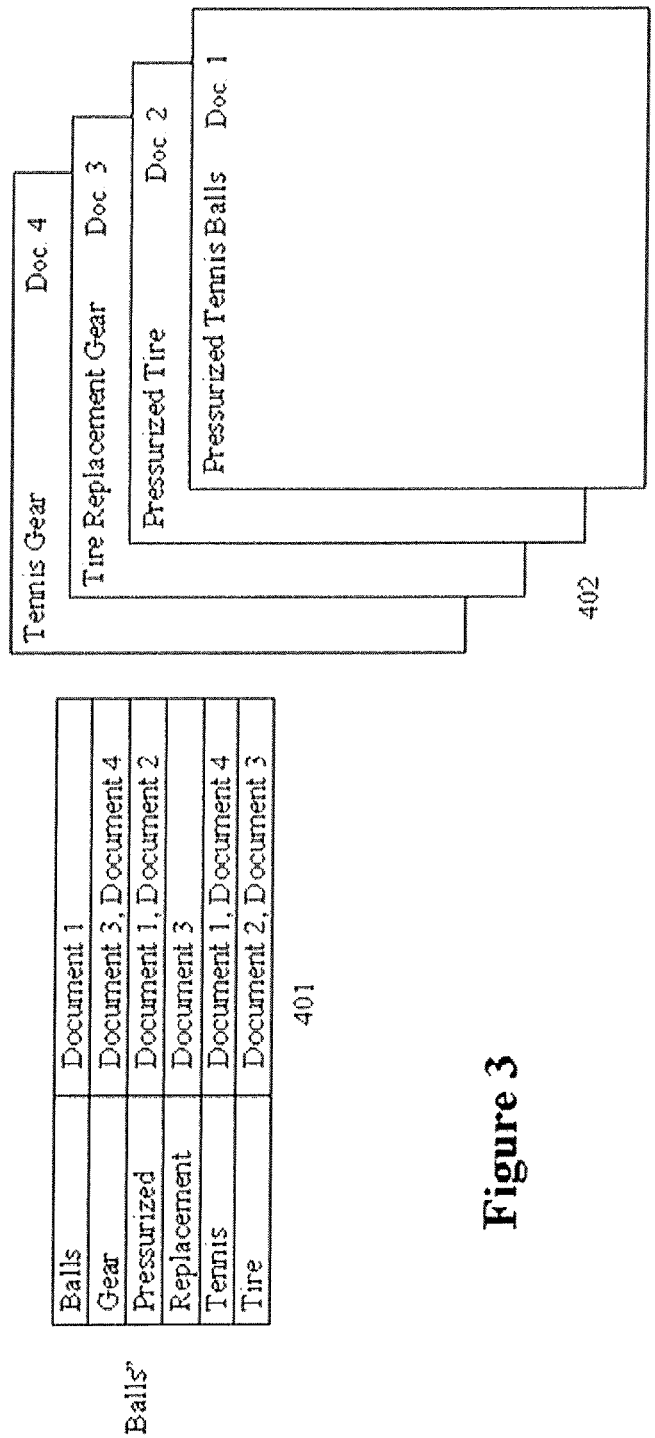
FIG. 3 depicts an index structure which could allow an online shopping system to determine what offers in its inventory include a given word without actually scanning those offers at query time

While the above disclosure discussed how candidate validation [110], product noun detection [115] and imputation [114] can operate individually, as shown in FIG. 1, in some implementations, all of those processes might be present, and their operation could be combined to facilitate an index creation process [109]. Index creation [109] can be used to create data structures which can allow an online shopping system to determine what offers are relevant to a query [101] without having to refer to or analyze the actual offers themselves. As an illustration of such a data structure, consider FIG. 3. FIG. 3 depicts an index structure [401] which could allow an online shopping system to determine what offers in its inventory [402] include a given word without actually scanning those offers at query time. Such an index structure [401] can be created by, for each word in an offer title, creating a row in the structure, and adding a reference to each offer having a title containing that word. To use such an index structure [401], a query [403] could be broken into its individual words, and a result could be obtained by retrieving the offers from the rows in the index structure [401] corresponding to the words in the query [403]. Thus, in the case of a query [403] for "Pressurized Balls," the system could retrieve documents 1 and 2 (the contents of the "Pressurized" and "Balls" rows) without having to search the available offers at query time. Of course, a real system is likely to have a much more extensive inventory than the four offers depicted in FIG. 3, and would likely include various optimizations and modifications to accommodate the corresponding increase in processing demands. The following disclosure illustrates certain modifications and optimizations which could be present in some implementations, as well as illustrating how different approaches to identifying and associating product nouns with offers could be combined to generate data structures used in an online shopping systems' query time processing.

As shown in FIG. 1, creating data structures used in query time processing can begin by providing offers from the online shopping system's database [103] to candidate validation [110] and product noun detection [115] processes. Using techniques such as described above for approving candidate product nouns, the candidate validation [110] process could create lists of product nouns [104] which could be incorporated into later processing, such as by providing raw material for training tools (e.g., Markov models) used in product noun detection [115], or simply by restricting search and matching space when the product noun detection [115] is applied to the offers. At the same time, a system following the architecture of FIG. 1 would likely also be performing product noun detection [115]. This could take place by continuously retrieving and analyzing offers from the database [103], thereby accommodating new offers which may be presented by merchants, or detected by the online shopping system's other automated processes (e.g., spiders). In such a case, where product noun detection [115] is performed simultaneously with candidate validation [110], there would likely be periodic (e.g., every three weeks) updates to the product noun detection process [115] to incorporate additional information from candidate validation [110] (e.g., by creating new models used to process offers). Of course, it is also possible that product noun detection [115] could be performed in series with candidate validation [110], such as where both candidate validation [110] and product noun detection [115] are fully automated processes running on a single machine.

After product noun detection [115] had been completed for the offers, the results [117], which would associate each offer with one or more product nouns, would be provided to the imputation process [114]. The imputation process [114] could then operate to form associations between offers and product nouns which were not necessarily found in those offers. Such operation could take place as described previously, or could include additional modifications and optimizations to help process the offers in the online shopping system's database [103]. For example, in some cases, the offers in a database [103] might include multiple offers for the same product from different merchants (e.g., offers from different stores where consumers could purchase a Playstation 3). In such cases, as a supplement (or alternative) to a taxonomy such as described with respect to FIG. 4 (or other type of taxonomy which might be present in a real life system), the online shopping system might organize offers according to products which could be purchased. In such a case, the imputation process [114] could be implemented such that each offer for a product would be associated not only with the product nouns identified for that offer during candidate validation [110] or product noun detection [115], but also with the product nouns from the other offers identified as being offers for the same product. The imputation process [114] could then output a set of associations [118] which would associate each offer for a product with all product nouns previously (e.g., during candidate validation [110] or product noun detection [115]) associated with any offer for the product, as well as other product nouns which might be associated during imputation as described previously. In the relevance computation, the latter newly associated nouns could be weighted by their original proportion (prevalence) within the product's offers, which, in some implementations, could be used as a certainty measure that such nouns truly belong to the product, thus providing a mechanism of ameliorating cases where a minority of offers that were misgrouped into the product would spread their (inappropriate for this product) nouns to the rest of the offers grouped under it.

Of course, it should be understood that there are other mechanisms of utilizing pre-existing associations during an imputation process [114], and that the example given above of imputations based on products is intended to be illustrative only, and not limiting. For example, in some cases, an imputation process could be configured to create new associations by using existing product nouns as stems which would be subject to modification. To illustrate, assume that the product noun "shoes" had been identified for an offer for "high heel shoes," and that that offer had been categorized in the class "women's apparel." Assume also that the "women's apparel" class was associated with a rule that if any of the class's offers were associated with gender neutral product nouns, new product nouns for those offers would be created by adding the modifier "women's." In such a case, the product noun "shoes" associated with the offer "high heel shoes" would be used to create the new product noun "women's shoes." Similar approaches could be taken with other attributes, such as age (e.g., appending "children's") or combined attributes, such as age and gender (e.g., appending "girl's").

Variations during an imputation process [114] which take advantage of the existence of already formed associations could also be implemented for other aspects of imputation, such as creation of strength data as described above. For example, consider a case where an imputation process [114] is configured to form associations between all offers within a single leaf node of a taxonomy used by an online shopping system. While it is possible that such associations will simply be given strength 1 (to reflect the fact that they are all taken from the same node), it is also possible that they could be given lower weights, such as to reflect the frequency of the product nouns being imputed. To illustrate, assume that an atomic node "tennis balls" [505] from the taxonomy of FIG. 4 includes 50 offers, 30 of which have existing associations with the product noun "pressureless tennis balls," and 20 of which have existing associations with the product noun "hard court practice balls." In such a case, the product noun "pressureless tennis balls" could be associated with the offers from which it was absent with a strength of 60%, while the product noun "hard court practice balls" could be associated with the offers from which it was absent with a strength of 40%, directly reflecting the underlying frequency of those product nouns in the node "tennis balls" [505]. Other variations (e.g., where imputation strength is based on frequency in user queries, rather than frequency in offers) are also possible, and will be immediately apparent to those of ordinary skill in the art in light of this disclosure. Accordingly, the discussion of possible variations to an imputation process [114] in the context of pre-existing associations between product nouns and offers should be understood as being illustrative only, and not limiting.

Regardless of how associations between product nouns and offers are created, in a system following the architecture of FIG. 1, once a final set of associations [118] is determined, it could be sent to an index creation process [109] to be used in the creation of data structures to facilitate query time processing. One example of such a structure is an optimized index [105], similar to the index structure [401] from FIG. 3, but modified to account for the increased processing requirements of a real system. There are a variety of possible ways in which an optimized index [105] might differ from the index structure [401] of FIG. 3. One way would be to build the optimized index [105] to reflect product nouns, rather than words, so as to focus on the most significant information. Another type of optimization would be to tie the rows in the optimized index [105] to a hash (or some other mapping) function which could translate product nouns (or words) into numbers, and then store indications of the offers associated with those product nouns (or words) at the rows in the index [105] given by the hash function. In this way, to find all offers which include "ball," it would be possible to feed "ball" into the hash function, and then go directly to the indicated row rather than having to search the index [105] for the "ball" row.

Other data structures in addition to (or as an alternative to) the optimized index [105] could also be created. For example, an index creation process [109] could also create a class probability index [106]. In some implementations, a class probability index [106] could be used to identify what class a query's result is most likely to be in, whether to narrow the search for results, to modify the way results are presented, or for some other reason. Such an index [106] could be created by, for each terminal node in a taxonomy (or, in some implementations, other nodes as well), storing data showing how frequently different product nouns were used in offers in that node (e.g., by scanning each offer in a node, and incrementing a counter corresponding to a product noun whenever a product noun was detected). Other data could also be stored, such as data on how frequently words in the offers were used as other than product nouns (e.g., as modifiers), or how frequently words appeared in offers in a certain node in general. The specific types of information in a class probability index [106], or even whether a class probability index [106] would be created at all, depend on the requirements and resources for a given implementation.

Of course, the above discussion should not be understood as an exhaustive description of tasks which could be performed at build time. Similarly, while the above discussion illustrated how various approaches to associating product nouns with offers could be combined to create data structures used at query time, it should be understood both that other approaches are possible, and that the approaches given are not limited to use in constructing data structures used at query time. As an example of another build time task which could be performed in some implementations, consider possible relationships between identification of product nouns and a taxonomy used to organize offers. As described previously, identification of product nouns can be guided by a taxonomy, both in terms of increasing efficiency of the process, and in terms of organizing the output. However, in some implementations, the identification of product nouns could also influence the taxonomy itself. For instance, identified product nouns (or more general word data gathered during candidate validation [110] and product noun detection [115]) could be subjected to clustering analysis to determine if a taxonomy should be modified (e.g., in a taxonomy with a terminal node "tennis balls," an observation of a cluster of offers which includes "pressureless tennis balls" and a separate cluster which includes "pressurized tennis balls" could result in the "tennis balls" node being subdivided according to those clusters). Similarly, in some cases product noun identification could influence how a taxonomy is used during imputation. For example, during product noun identification, it can be determined that candidate product nouns are too general to unambiguously place a product in a particular class (e.g., "ball" might be too general to distinguish between tennis balls and soccer balls). In some cases, when an over-general product noun is identified, a disambiguating modifier can be automatically associated with the branch in the taxonomy where the offer should be placed (e.g., in the taxonomy of FIG. 4, the modifier "tennis" could be associated with "tennis equipment" [506]). Other build time activities are also possible, and will be immediately apparent to those of ordinary skill in the art in light of this disclosure.

Returning now to the discussion of query time processing, just as there are numerous possible structures (and variations on those structures) which can be created at build time, there are also numerous possible approaches (and variations on those approaches) to using those structures (and other available data) to determine a response [108] at query time. For example, consider possible implementations of a taxonomy matching process [119]. In some implementations, a taxonomy matching process [119] could operate using a class probability index [106] which maintains, for each class, the probability that words are used as product nouns in that class, and the probability that words are used in a non-product noun capacity. With such an index [106], the taxonomy matching process [119] could, for each class, find the probability that the query [101] matches the class by multiplying the probability that the product noun(s) in the query [101] are used as product nouns in the class, by the probability that the non-product noun words in the query [101] are used in a non-product noun sense in the class. However, in other implementations, rather than using a class probability index [106] with word usage data such as described, there could be a class probability index [106] which reflects the overall frequencies of words in a class, regardless of usage. In such a case, the probability that a query [101] matches a class could be determined by examining the words in the query [101] and identifying which class those words appeared in with the highest frequency.

Combined approaches are also possible. For example, in some cases, data related to whether words are used as product nouns may be unavailable for certain classes (e.g., a newly added class in a taxonomy). In such a case, when word usage data is available for a particular class, then the probability that a query matches that class could be determined using the word usage data (or data structures created based on that data), while if word usage data is unavailable, overall frequency information could be used. As another example of a combined approach, it is possible that information from data structures reflecting word usage data could be combined with information from data structures reflecting other types of data (e.g., word frequency) for all classes. In such a case, the taxonomy matching process [119] might receive a combined translation [120] of the query [110] from the query processing process [113], which would include both an identification of words in the query [101] in general, and an identification of words in the query [101] in terms of product noun and non-product noun usage. That information could then be plugged into a formula such as provided below in equation 1, where the probabilities that a query matches a particular class derived using usage and overall data are averaged.

$$P_{combined}(\text{class}|\text{query})=w*P_{noun}(\text{class}|\text{query})+(1-w)*P_{non\_noun}(\text{class}|\text{query}) \quad \text{Equation 1.}$$

In equation 1 above, $P_{combined}$ is the probability that a query is in a given class based on a combination of usage and overall data. $P_{noun}$ the probability that the query is in the given class based on the likelihood that its product nouns are used as product nouns in the class. $P_{non\_noun}$ is the probability that the query is in the given class based on the likelihood the words in the query are used in the class in a non-noun manner. w is a weight value reflecting the confidence in the noun versus the non-noun part of the calculation. This weight value can be defined in a number of ways. For example, it can be automatically created using known machine learning techniques (e.g., trial and error, hill climbing, simulated annealing, etc) by tuning the value such that the results returned by the taxonomy matching process using that value would match a defined set of known good results over a set of standard queries. Modifications on the equation set forth above are also possible. For example, in some cases, rather than using a standard weight w there could be multiple weights $w_{class}$ depending on the class being evaluated. Similarly, there could be cases where tests could be performed before the equation is applied. For example, a test could be run to verify that there is at least one class for which $P_{noun}(\text{class}|\text{query})>0$. If that test succeeded, then the above equation could be used. Otherwise, classification could be performed by considering only the $P_{non\_noun}$ values.

Query time activities can also vary in terms of implementation of the information retrieval process [121] which retrieves information from the database [103] which will make up the substance of the response [108]. For example, an information retrieval process [121] could be implemented to simply receive word IDs [122] determined for the words in the query [101] during query processing [113], then match those word IDs [122] against one or more optimized indices [105] created at build time, without actually considering product nouns. Alternatively, and depending on the optimized indices [105] created at build time, the information retrieval process [121] might compare IDs identified for product nouns, or might take a combined approach, such as by comparing the word IDs [122] with an optimized index [105] showing the existence of words in the descriptive portion of an offer, while comparing product noun IDs with an optimized index [105] showing the existence of product nouns in the title of an offer. It is also possible that an information retrieval process [121] could include optimizations similar to those discussed with respect to build time processing. For example, as discussed above, in some implementations, offers might be organized so that multiple offers for the same product from different merchants would be grouped together as a unit. In such a case, the information retrieval process [121] could use an optimized index [105] which indicates whether any of the offers grouped as a product matches a word from the query's word IDs [122], and, if so, retrieve all of the offers for that product from the database [103]. Other variations are also possible (e.g., using an optimized index [105] for products to identify if any products are relevant to the user's query, and only retrieving individual offers if the user indicates an interest in a product) and will be immediately apparent to those of ordinary skill in the art in light of this disclosure.

Also, as shown in FIG. 1, some implementations might include a noun similarity process [116] which determines similarity between a set of query product nouns [123] identified during query processing [113] and the list of product nouns [104] identified at build time. In implementations where it is present, a noun similarity process [116] might be implemented either to simply compare product nouns [123] from the query [101] with those identified at build time [104], or could also perform some manipulation functions. To illustrate these variations, consider the case where the product noun "Camera Kit" is identified for a query, and is being compared with the product noun "Digital Camera Kit" from the list derived at build time [104]. A similarity measure can be determined initially by calculating the cosine similarity measure for the words in the product nouns (e.g., "Camera" versus "Digital", "Camera" versus "Camera", "Camera" versus "Kit", etc) and then combining the measures for the words into a similarity measure for the product nouns as a whole (e.g., by adding or multiplying the individual measures). However, in some implementations, before calculating the similarity measure, the product nouns to be compared could be modified, such as by removing grouping words, like "set" "bundle" and their synonyms. As another example of a modification, in some cases, instead of removing words, the words in a product noun could be re-ordered so that the words having the most meaning would be given the most weight. This type of approach could be implemented in cases where, instead of simply using a cosine similarity measure, there was a weighted cosine similarity measure, so that the ultimate similarity score would be more strongly influenced by the similarity scores for words at the end of the product nouns (e.g., weight given to the similarity scores could be increased exponentially with the proximity of the words to the end of the product noun). So, to illustrate, the product nouns "Camera Kit" and "Digital Camera Kit" could be reordered as "Kit Camera" and "Kit Digital Camera" when creating the similarity measure.

It should be understood that the examples and discussion above are intended to be illustrative only, and other variations are possible and will be immediately apparent to those of ordinary skill in the art. For example, in some implementations, a noun similarity process [116] might combine comparison and manipulation approaches, such as by initially performing a strict comparison, then, if there was not identity (or some specified level of similarity) between the product nouns being compared, moving on to comparing product nouns with words removed; then, if there still wasn't identity, move on to comparing re-ordered product nouns. Similarly, other types of comparison metrics (e.g., calculating Dice's coefficient, or the Levenshtein distance, rather than the cosine measure), or other types of comparisons (e.g., treating a query product noun which differs from a product noun on the list [104] only in the addition of some prefix as being identical to the product noun from the list [104]) could also be used. Accordingly, the discussion of the noun similarity process [116], as well as the discussions of the taxonomy matching process [119] and the information retrieval process [121] should be treated as illustrative only, and not limiting.

Figure 5A:
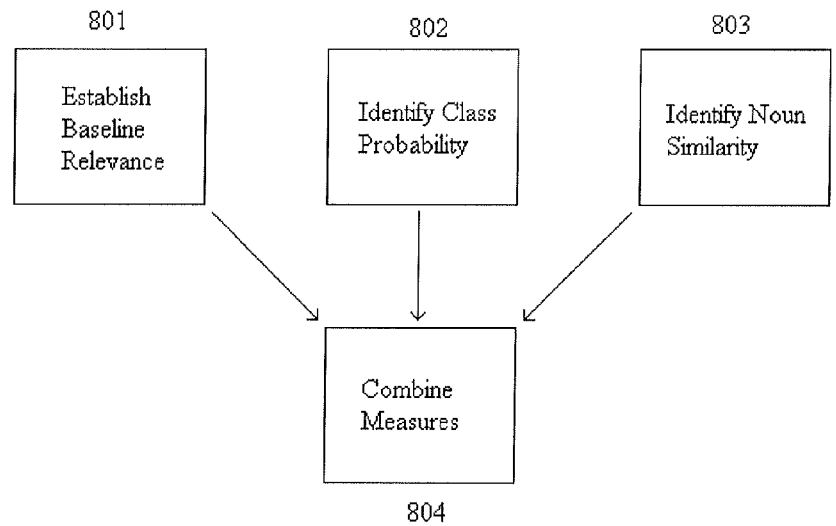
FIG. 5*a* depicts a process which could be used to determine a response to a query.

Regardless of variations which might exist in particular implementations, once the taxonomy matching [119], noun similarity [116] and information retrieval [121] processes are completed for a query, a result ranking process [107] could be used to determine the final response [108] for the a user. As an example of how a result ranking process [107] might operate, consider the steps shown in FIG. 5a. As depicted in FIG. 5a, a result ranking process [107] can include a step of establishing a baseline relevance [801]. This baseline relevance measure can be established simply by assigning a placeholder value (e.g., 1) which could be modified in subsequent calculations. Alternatively, it could be determined in a manner which reflects the actual relevance of a document being ranked, such as by applying standard techniques (e.g., analysis of keyword frequency and placement, popularity as shown by links or clickthrough rate, etc) for quantifying relevance. In addition to establishing a baseline relevance [801], the process depicted in FIG. 5a also includes steps of identifying class probability [802] and noun similarity [803]. Depending on how the previous query time processing tasks were performed, these steps could involve no more than looking up appropriate rows in tables. For example, in some cases, a taxonomy matching process [119] would produce a data structure [124] showing, for each class in the taxonomy, the probability that the query [101] matches that class. In such cases, it would be possible to identify the class probability for a document being ranked by identifying the class for the document, then looking up the associated probability in the data structure [124]. Similarly, in a case where a noun similarity process [116] provides a list [125] showing the similarity between the query [101] and the product nouns from the list of product nouns [104], identifying the noun similarity [803] for the document being ranked could be accomplished by simply looking up the entries in the list [125] associated with the product nouns for the document.

With the identification steps [802][803] complete, their outputs could be combined [804] with the baseline relevance to obtain a final relevance score for the document being ranked. Like the identification steps, in some implementations, this might be done straightforwardly, such as by multiplying the baseline relevance by the identified class probability, by the identified noun similarity (or averaging them together, etc). Alternatively, some type of weighting or emphasis might be incorporated. For example, an online shopping system could keep metrics regarding what types of measurements resulted in results having high user clickthrough rates, and modifying the approach to combining the baseline with the class and noun similarity measures accordingly (e.g., by multiplying the noun similarity score by a weighting factor of 100 or some other appropriate number before combining it with the other measures). However, whatever approach is used to rank the output [112] of the information retrieval process [121], once the ranking [107] is complete, the output [112] could be ordered according to the ranking, and provided as a response [108] to the user [102].

Figure 5B:
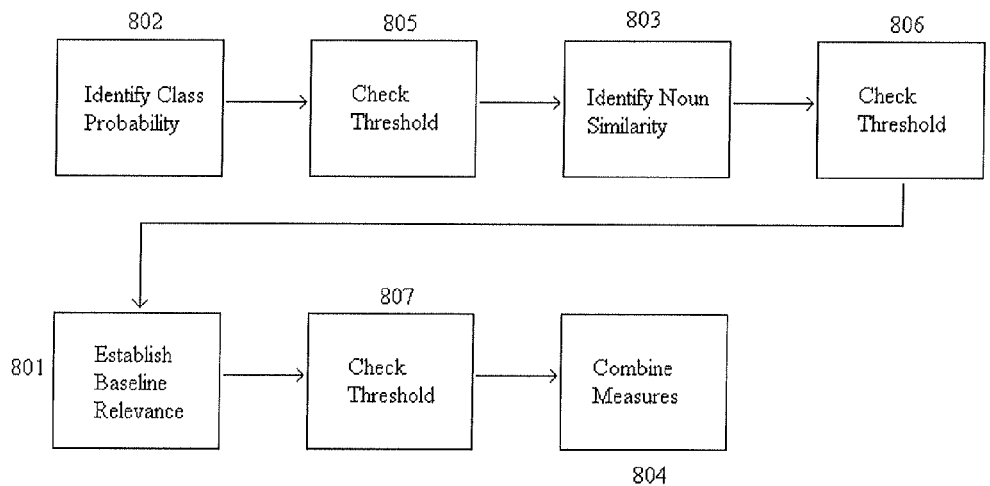
FIG. 5*b* depicts a process which could be used to determine a response to a query.

Variations on the description of the result ranking [107] such as shown in FIG. 5a are possible. As an example, in some implementations, rather than performing the identification [802][803] and baselining [801] steps independently, those steps could be performed one after another, potentially with the results of one step influencing the operation the next. As an example of how this might take place, consider the diagram of FIG. 5b. In FIG. 5b, the result ranking process [107] would begin with the identification of class probability [802] for the document being ranked. Subsequently, the process would continue with the identification of noun similarity [803], potentially after verification [805] to ensure that some threshold level of relevance was indicated by the class probability identification [802]. A similar process would be followed for the other steps, with a second verification [806] after noun similarity identification [803] and a third after establishing a baseline [801]. Of course, variations on the figure of 5b are also possible. For example, the use of multiple verification steps [805][806][807] would be most useful in cases where subsequent steps are processing intensive, and there is the potential to eliminate a document from contention as relevant without completing the process (e.g., if there is a 0% class probability). Other orders, or successive performance of steps without verifications could also be used, depending on the requirements and resources of a particular embodiment.

As with the result ranking process [107], other aspects of query time processing could also be modified for serial, rather than parallel, performance. As an example, in some implementations, query time processing might be structured to begin with taxonomy matching [119]. The results of the taxonomy matching [119] could then be used to minimize processing which would need to be performed subsequently. For instance, the noun similarity process [116] could be configured so that it would only determine similarity scores for product nouns in classes having a probability exceeding some threshold as indicated by the taxonomy matching [119]. Similarly, in some implementations, taxonomy matching [119] might be the first step which takes place after a query [101] is received (e.g., a class in a taxonomy could be determined by matching words in the query against word frequency data for the different classes in the taxonomy). This could potentially improve the results query processing [113], by allowing the routines which identify product nouns to take advantage of classification information for a query in the same way as described previously for build time product noun detection [115]. Of course, early execution of taxonomy matching [119] is not the only change to query time processing that could be made in some implementations. For example, in some implementations, the information retrieval process [121], before retrieving the actual documents from the database [103], could perform the identification steps from the result ranking process [107] and only retrieve results from the database [103] which met some required level of relevance. Other variations, such as adding additional processing steps to accommodate different types of interfaces (e.g., adding speech recognition steps for a voice interface) are also possible and will be immediately apparent to those of ordinary skill in the art.

Additional variations, besides modification for serial performance, could also be made. For example, some implementations might include features which support repeated performance of various functions to determine the result [108] to be sent to a user computer [102]. To illustrate, consider a case where a query [101] is not susceptible to precise analysis. This might be caused by a number of factors, such as a user overdetermining a query (e.g., providing significant extraneous information) or by providing a query which is simply inaccurate (e.g., a query for a digital camera identified as a "Kodak [rather than Canon] Powershot"). In such a case, if the query time processing indicated that none of the offers in the database [103] had a sufficiently high relevance (e.g., greater than some threshold), rather than sending a result [108] to the user computer [102], the system might modify the query [101] by deleting one or more words and re-running the query time processing. This type of process could be performed iteratively, until the query [101] had been completely deleted, or until a result [108] with sufficiently high relevance was derived. Additionally, in some implementations, this type of repetition could also incorporate product nouns. For example, in a case where modified queries are repeatedly rerun, the system might be configured so that the portion of a query identified as a product noun would be modified (e.g., deleted) last. Similar modifications could be made to activities other than word deletion. For example, in implementations where query processing [113] includes spell checking queries, the spell checking might be varied based on product nouns identified in the query, or on the query's position in a taxonomy (e.g., for a query in a "military models" category, or which contained a product noun "combat toys," a spell check might change the word "Canon" to "Cannon," while for a query in an "digital cameras" category, or which contained a product noun "cameras" the spell check might change "Cannon" to "Canon"). Other variations are also possible, and will be immediately apparent to those of ordinary skill in the art in light of this disclosure. Accordingly, the preceding discussion should be understood as being illustrative only, and not limiting.

There also exists broad potential for variation in the machines, techniques and tools which could be used to implement the disclosed technology. For example, in some cases, a simple architecture such as shown in FIG. 6 could be used, where a single server [601] would perform all the various build time and query time processes necessary to provide responses from a database [103] to a user [102]. Indeed, in some cases, the database [103] might be physically integrated with the server [601], and both might be combined with the user computer [102], such as an implementation in which the disclosed technology is incorporated into a utility for searching for data on a user's hard drive. Systems which are much more complicated than shown in FIG. 6 are also possible. For instance, in some implementations, there could be multiple dedicated systems used for build and query time processing, with those systems running continuously in parallel to provide uninterrupted availability for processing user queries, and to refresh, identify product nouns in, and classify, offers in the database [103]. In such a case, the various processes described above could be implemented to run on single systems (e.g., as multiple threads or applications), could each operate on its own dedicated hardware, or could be operated using some combination of dedicated and shared resources.

Similar variation could occur in interactions between processes. For example, the interaction between the candidate validation [110], product noun detection [115], imputation [114], and index creation [109] processes could take place by storing relevant data structures (e.g., associations [118] between offers and product nouns) in memory (e.g., RAM, or virtual memory) for a computer, and passing them between processes as arguments. Alternatively, information could be stored as permanent (or semi-permanent) data structures in non-volatile memory which could be accessed as needed (e.g., as might be the case for the list of product nouns [104]). As yet another alternative, in some embodiments where different intermediate communications are used to create a final output (e.g., an optimized index [105]), instead of passing the intermediate data between processes, the data could be added directly to the final output (e.g., a product noun detection [115] process could directly add the product nouns for an offer to the appropriate places in an optimized index [105]), and then supplemented as necessary (e.g., the imputation process [114] could add imputed product nouns to the optimized index [105] which had been partially populated by the product noun detection process [115]) rather than having a separate creation process (e.g., index creation [109]) as shown. Further, in some cases, different data structures might be stored as encoded data, from which the appropriate information could be derived as necessary. For example, in a case where results are classified using both the probability that words are used as product nouns in a class, and the probability that words are used without respect to whether they are used as product nouns, instead of having separate data structures for noun and overall usage, there could be only a single data structure which stores the noun usage data as well as the data on how words were used in a non-product noun sense, and this data could then be combined to obtain the overall usage as needed at query time. As a result, the discussion of hardware used above, as well as the communications and interactions of the architecture of FIG. 1, should be understood as illustrative only, and not limiting.

Similarly, the focus of this disclosure on an online shopping system which uses product nouns to respond to queries is intended to be illustrative only, and the teachings of this disclosure could be applied in other contexts by those of ordinary skill in the art. For example, techniques such as described above could be also applied in the context of a general purpose search engine to identify noun phrases which reflect the subject matter of queries more generally, rather than simply using noun phrases which identify a product a user is seeking to purchase. Variations which are based on identifying parts of speech other than noun phrases are also possible. For example, an information retrieval system could be implemented to use techniques such as described above in cases where the information sought by a query is reflected in a modifier. Thus, in such a system, there could be lists of modifiers created, modifiers could be identified in queries and in responsive information, and indices based on modifiers could be used for query time processing.

Combined approaches could also be implemented. For example, some information retrieval tools could create parallel taxonomies, word lists, statistical models, etc., for use in situations where different approaches to processing queries could yield different result sets. To illustrate, consider the query "ing form." A noun based approach could result in a response which is focused on different types of forms, particularly those used by (or relating to) the Dutch financial services institution Ing Group. By contrast a modifier based approach could result in a response which focuses on grammar, where the letters "ing" could be used as a modifier to describe certain verb forms. In such a case, some systems might generate (and present) the results of both approaches together (e.g., grouped, in the same way that individual offers can be grouped under products in certain implementations of an online shopping system) so that the response would be meaningful both for users who wanted to know how to communicate with their brokers, and for users who couldn't remember how to describe the result of adding the suffix -ing to a verb.

In general, this disclosure is intended to illustrate technology developed by the inventors, but is not intended to explicitly detail every application of that technology, or every benefit which different aspects of the technology might provide.

Accordingly, the protection afforded by the claims in this document, as well as in any documents claiming the benefit of this document, should not be limited to the subject matter explicitly set forth. Instead, such protection should be understood to be defined by the claims themselves, when the terms in the claims which are explicitly defined under the heading "Explicit Definitions" are given their explicit definitions, and when all other terms are given their broadest reasonable interpretation as shown by a general purpose dictionary. To the extent that the interpretation which would be given to any claims based on the above disclosure is in any way narrower than the interpretation which would be given based on the explicit definitions for those claims and the broadest reasonable interpretation as provided by a general purpose dictionary, the interpretation provided by the explicit definitions and broadest reasonable interpretation as provided by a general purpose dictionary shall control, and the inconsistent construction based on this disclosure shall have no effect.

Explicit Definitions

When used in the claims, "based on" should be understood to mean that something is determined at least in part by the thing that it is indicated as being "based on." When something is completely determined by a thing, it will be described as being "based EXCLUSIVELY on" the thing.

When used in the claims, "cardinality" of a set refers to the number of elements in the set. When cardinality of two sets is referred to as "identical," it should be understood to mean that those two sets have the same number of elements. For example, the sets {1, 2, 4} and {"cat", "dog", "horse"} have identical cardinality.

When used in the claims, "cleaning" should be understood to mean removing something, if present, from the thing being cleaned. For example, "cleaning" dimension data from a raw input string should be understood to mean removing dimension data from the raw input string if the raw input string comprises dimension data prior to cleaning.

When used in the claims, "computer" should be understood to mean a device or group of devices which is capable of performing one or more logical and/or physical operations on data to produce a result.

When used in the claims, "computer readable medium" should be understood to refer to any object, substance, or combination of objects or substances, capable of storing data or instructions in a form in which they can be retrieved and/or processed by a device. A computer readable medium should not be limited to any particular type or organization, and should be understood to include distributed and decentralized systems however they are physically or logically disposed, as well as storage objects of systems which are located in a defined and/or circumscribed physical and/or logical space.

When used in the claims, "configure" in the context of "configuring a computer" should be understood to mean providing a computer with specific data (which may include instructions) which can be used in performing the specific acts the computer is being "configured" to do. For example, installing Microsoft WORD on a computer "configures" that computer to function as a word processor, which it does using the instructions for Microsoft WORD in combination with other inputs, such as an operating system, and various peripherals (e.g., a keyboard, monitor, etc. . . . ).

When used in the claims, "determine" should be understood to refer to the act of generating, selecting or otherwise specifying something. For example, to obtain an output as the result of analysis would be an example of "determining" that output. As a second example, to choose a response from a list of possible responses would be a method of "determining" a response.

When used in the claims, "dimension data" should be understood to refer to information specifying magnitude. Examples of dimension data include sizes such as "small," "medium," and "large"; measurements such as "¾ inch" and "two by four"; and weights, such as "40 lbs".

When used in the claims, "instance" should be understood to refer to an occurrence of something. To illustrate, in the set {1, 1, −2}, there are two "instances" of the number 1, and one "instance" of the number −2 (similarly, there are two "instances" of positive numbers, and one "instance" of a negative number).

When used in the claims, "invented part of speech" should be understood to refer to a "part of speech" associated with a particular context into which words or word groups are placed based on observations that those words or word groups are significant when used in that context. For example, a "product noun" is an "invented part of speech" which is associated with the context of products (e.g., buying, selling, researching or describing products) and into which words or word groups can be placed based on observations that those words or word groups at least partially distinguish one product from another.

When used in the claims, "natural language part of speech" should be understood to refer to a "part of speech" into which words or word groups can be placed which is organically present in the day to day usage of those words in a variety of contexts. Examples of "natural language parts of speech" include nouns (words signifying concrete or abstract entities, such as people, places, things, states, or ideas), verbs (words signifying activities, processes or actions), and noun or verb phrases (word groups which are used as nouns or verbs).

When used in the claims, "part of speech" should be understood to refer to a class into which words or word groups can be placed.

When used in the claims, "set" should be understood to refer to a number, group, or combination of zero or more things of similar nature, design, or function.

When used in the claims, "taxonomy" should be understood to refer to an organizing system which comprises a plurality of classes and their relationships. A "position" in the taxonomy refers to a specific class from the organizing system.

When used in the claims, a "word group" should be understood to refer to a set of words.

What is claimed is:

1. A system comprising:
   (a) a database storing a plurality of records;
   (b) a computer readable medium storing data comprising a dictionary list comprising a plurality of word groups identified as corresponding to an invented part of speech;
   (c) a computer configured via a set of data to perform a set of tasks comprising:
      (i) receiving an input string, the input string comprising a plurality of words comprising an input word group corresponding to the invented part of speech;
      (ii) calculating a set of part of speech scores for the input string wherein calculating the set of part of speech scores comprises, for each word group from a set of word groups from the dictionary list, calculating a measure of similarity between:
         (1) the input word group corresponding to the invented part of speech; and
         (2) the word group from the set of word groups from the dictionary list for which the part of speech score is being calculated;
      (iii) determining a result set comprising a set of records retrieved from the database, wherein each record from the result set comprises an identifying word group corresponding to the invented part of speech; and
(iv) for each record in a subset of records from the result set, determining a match score based on a relevant part of speech score from the previously calculated set of part of speech scores, wherein the relevant part of speech score corresponds to the identifying word group from the record in the subset of records for which the match score is being determined; and
wherein the cardinality of the subset of records is less than or equal to the cardinality of the set of records from the result set;
wherein:
(A) each record from the plurality of records stored in the database corresponds to a class from a plurality of classes;
(B) the data stored on the computer readable medium further comprises a class probability index, wherein the class probability index comprises, for each class in a subset of the plurality of classes:
(i) general probability data that words appear in records corresponding to the class; and
(ii) specialized probability data that word groups in the dictionary list are used as the invented part of speech in records corresponding to the class;
(C) calculating a set of class scores for the input string, wherein the set of class scores comprises, for each class from the subset of the plurality of classes, a probability that the input string corresponds to that class;
(D) each record from the result set corresponds to a class from the subset of the plurality of classes; and
(E) the match score for each record from the subset of records from the result set is further based on a relevant class score from the previously calculated set of class scores, wherein the relevant class score corresponds to the class corresponding to the record from the subset of records for which the match score is being determined;
wherein the cardinality of the subset of the plurality of classes is less than or equal to the cardinality of the plurality of classes.

2. The system of claim 1, wherein calculating the set of class scores for the input string comprises, for each class in the subset of the plurality of classes, calculating a corresponding class score using an equation, wherein using the equation comprises calculating:

$$P_{combined}(\text{class}|\text{input}) = W_{class} * P_{invented}(\text{class}|\text{input}) + (1 - W_{class}) * P_{non\_invented}(\text{class}|\text{input})$$

wherein:
(a) $P_{invented}(\text{class}|\text{input})$ is a specialized probability that the input word group corresponding to the invented part of speech is used as the invented part of speech in records corresponding to the class;
(b) $P_{non\_invented}(\text{class}|\text{input})$ is a general probability that the words from the input string appear in records corresponding to the class;
(c) $P_{combined}(\text{class}|\text{input})$ is the corresponding class score, representing a probability that the input string corresponds to the class; and
(d) $W_{class}$ is a weight reflecting confidence in the values of $P_{invented}(\text{class}|\text{input})$ and $P_{non\_invented}(\text{class}|\text{input})$ for the class.

3. The system of claim 2, wherein $P_{combined}(\text{class}|\text{input})$ for a first class from the subset of the plurality of classes is calculated using a different $W_{class}$ value than is used to calculate $P_{combined}(\text{class}|\text{input})$ for a second class from the subset of the plurality of classes.

4. The system of claim 1, wherein calculating the set of class scores for the input string comprises:
(a) if there is at least one class in the plurality of classes for which a probability that the input word group corresponding to the invented part of speech is used as the invented part of speech in records corresponding to that class is greater than zero then, for class in the subset of the plurality of classes, calculating a corresponding class score using an equation wherein using the equation comprises calculating:

$$P_{combined}(\text{class}|\text{input}) = W_{class} * P_{invented}(\text{class}|\text{input}) + (1 - W_{class}) * P_{non\_invented}(\text{class}|\text{input})$$

wherein:
$P_{invented}(\text{class}|\text{input})$ is a specialized probability that the input word group corresponding to the invented part of speech is used as the invented part of speech in records corresponding to the class;
(ii) $P_{non\_invented}(\text{class}|\text{input})$ is a general probability that the words from the input string appear in records corresponding to the class;
(iii) $P_{combined}(\text{class}|\text{input})$ is the corresponding class score, representing a probability that the input string corresponds to the class; and
(iv) $W_{class}$ is a weight reflecting confidence in the values of $P_{invented}(\text{class}|\text{input})$ and $P_{non\_invented}(\text{class}|\text{input})$ for the class;
(b) otherwise, if there is no class in the plurality of classes for which the probability that the input word group corresponding to the invented part of speech is used as the invented part of speech in records corresponding to that class is greater than zero then, for class in the subset of the plurality of classes, calculating the corresponding class score comprises calculating the class score based on $P_{non\_invented}(\text{class}|\text{input})$, without considering whether the input word group is used as the invented part of speech in records corresponding to the class.

5. The system of claim 1 wherein determining the match score for each record in the subset of records from the result set comprises combining a set of scoring data comprising:
(a) the relevant class score corresponding to the record;
(b) the relevant part of speech score corresponding to the record; and
(c) a baseline score corresponding to the record;
wherein combining the set of scoring data comprises weighting the relevant part of speech score corresponding to the record by multiplying the relevant part of speech score corresponding to the record by a weighting factor.

6. A system comprising:
(a) a database storing a plurality of records;
(b) a computer readable medium storing data comprising a dictionary list comprising a plurality of word groups identified as corresponding to an invented part of speech;
(c) a computer configured via a set of data to perform a set of tasks comprising:
(i) receiving an input string, the input string comprising a plurality of words comprising an input word group corresponding to the invented part of speech;
(ii) calculating a set of part of speech scores for the input string, wherein calculating the set of part of speech scores comprises, for each word group from a set of word groups from the dictionary list, calculating a measure of similarity between:
(1) the input word group corresponding to the invented part of speech; and (2) the word group from the set of word groups from the dictionary list for which the part of speech score is being calculated; and (iii) determining a result set comprising a set of records retrieved from the database, wherein each record from the result set comprises an identifying word group corresponding to the invented part of speech; and (iv) for each record in a subset of records from the result set, determining a match score based on a relevant part of speech score from the previously calculated set of part of speech scores, wherein the relevant part of speech score corresponds to the identifying word group from the record in the subset of records for which the match score is being determined; and wherein the cardinality of the subset of records is less than or equal to the cardinality of the set of records from the result set;

wherein calculating the set of part of speech scores for the input string comprises, for each word group from the set of word groups from the dictionary list, calculating a cosine similarity measure between:

(A) a first word group corresponding to the input word group corresponding to the invented part of speech; and (B) a second word group corresponding to the word group from the set of word groups from the dictionary list;

wherein the cosine similarity measure is weighted by exponentially increasing the weight given to the similarity of words as those words approach the end of the first word group and the second word group.

7. The system of claim 6, wherein calculating the set of part of speech scores for the input string comprises:

(a) defining the first word group by reordering the input word group by moving any grouping words from the input word group to the beginning of the input word group;

(b) defining the second word group by reordering the word group from the set of word groups from the dictionary list by moving any grouping words from the word group from the set of word groups from the dictionary list to the beginning of the word group from the set of word groups from the dictionary list.

8. The system of claim 6, wherein calculating the set of part of speech scores for the input string comprises:

(a) defining the first word group by deleting any grouping words from the input word group; and (b) defining the second word group by deleting any grouping words from the word group from the set of word groups from the dictionary list.

9. A method comprising:

(a) receiving an input string, the input string comprising a plurality of words comprising an input word group corresponding to an invented part of speech;

(b) calculating via a computer a set of part of speech scores for the input string, wherein calculating the set of part of speech scores comprises, for each word group from a set of word groups from a dictionary list stored in advance on a computer readable medium, calculating a measure of similarity between:

(i) the input word group corresponding to the invented part of speech; and (ii) the word group from the set of word groups from the dictionary list for which the part of speech score is being calculated;

wherein the dictionary list comprises a plurality of word groups identified as corresponding to the invented part of speech;

(c) determining a result set comprising a set of records retrieved from a database wherein each record from the result set comprises an identifying word group corresponding to the invented part of speech; and (d) for each record in a subset of records from the result set, determining via the computer a match score based on a relevant part of speech score from the previously calculated set of part of speech scores, wherein the relevant part of speech score corresponds to the identifying word group from the record in the subset of records for which the match score is being determined; and wherein the cardinality of the subset of records is less than or equal to the cardinality of the set of records from the result set;

wherein:

(A) each record stored in the database corresponds to a class from a plurality of classes;

(B) in addition to storing the dictionary list, the computer readable medium also has stored therein a class probability index, wherein the class probability index comprises, for each class in a subset of the plurality of classes:

(i) general probability data that words appear in records corresponding to the class; and (ii) specialized probability data that word groups in the dictionary list are used as the invented part of speech in records corresponding to the class;

(C) the method further comprises calculating a set of class scores for the input string, wherein the set of class scores comprises, for each class from the subset of the plurality of classes, a probability that the input string corresponds to that class;

(D) each record from the result set corresponds to a class from the subset of the plurality of classes; and (E) the match score for each record from the subset of records from the result set is further based on a relevant class score from the previously calculated set of class scores, wherein the relevant class score corresponds to the class corresponding to the record from the subset of records for which the match score is being determined;

wherein the cardinality of the subset of the plurality of classes is less than or equal to the cardinality of the plurality of classes.

10. The method of claim 9, wherein calculating the set of class scores for the input string comprises, for each class in the subset of the plurality of classes, calculating a corresponding class score using an equation, wherein using the equation comprises calculating:

$$P_{combined}(class|input) = W_{class} * P_{invented}(class|input) + (1 - W_{class}) * P_{non\_invented}(class|input)$$

wherein:

(a) $P_{invented}(class|input)$ is a specialized probability that the input word group corresponding to the invented part of speech is used as the invented part of speech in records corresponding to the class;

(b) $P_{non\_invented}(class|input)$ is a general probability that the words from the input string appear in records corresponding to the class;

(c) $P_{combined}(class|input)$ is the corresponding class score, representing a probability that the input string corresponds to the class; and (d) $W_{class}$ is a weight reflecting confidence in the values of $P_{invented}$(class|input) and $P_{non\_invented}$(class|input) for the class.

11. The method of claim 9, wherein calculating the set of class scores for the input string comprises:
   (a) if there is at least one class in the plurality of classes for which a probability that the input word group corresponding to the invented part of speech is used as the invented part of speech in records corresponding to that class is greater than zero then, for class in the subset of the plurality of classes, calculating a corresponding class score using an equation wherein using the equation comprises calculating:

$$P_{combined}(class|input) = W_{class} * P_{invented}(class|input) + (1 - W_{class}) * P_{non\_invented}(class|input)$$

wherein:
   (i) $P_{invented}$(class|input) is a specialized probability that the input word group corresponding to the invented part of speech is used as the invented part of speech in records corresponding to the class;
   (ii) $P_{non\_invented}$(class|input) is a general probability that the words from the input string appear in records corresponding to the class;
   (iii) $P_{combined}$(class|input) is the corresponding class score, representing a probability that the input string corresponds to the class; and
   (iv) $W_{class}$ is a weight reflecting confidence in the values of $P_{invented}$(class|input) and $P_{non\_invented}$(class|input) for the class;
   (b) otherwise, if there is no class in the plurality of classes for which the probability that the input word group corresponding to the invented part of speech is used as the invented part of speech in records corresponding to that class is greater than zero then, for class in the subset of the plurality of classes, calculating the corresponding class score comprises calculating the class score based on $P_{non\_invented}$(class|input), without considering whether the input word group is used as the invented part of speech in records corresponding to the class.

12. The method of claim 9 wherein determining the match score for each record in the subset of records from the result set comprises combining a set of scoring data comprising:
   (a) the relevant class score corresponding to the record;
   (b) the relevant part of speech score corresponding to the record; and
   (c) a baseline score corresponding to the record;
   wherein combining the set of scoring data comprises weighting the relevant part of speech score corresponding to the record by multiplying the relevant part of speech score corresponding to the record by a weighting factor.

13. A method comprising:
   (a) receiving an input string, the input string comprising a plurality of words comprising an input word group corresponding to an invented part of speech;
   (b) calculating via a computer a set of part of speech scores for the input string, wherein calculating the set of part of speech scores comprises, for each word group from a set of word groups from a dictionary list stored in advance on a computer readable medium, calculating a measure of similarity between:
      (i) the input word group corresponding to the invented part of speech; and
      (ii) the word group from the set of word groups from the dictionary list for which the part of speech score is being calculated;
      wherein the dictionary list comprises a plurality of word groups identified as corresponding to the invented part of speech;
   (c) determining a result set comprising a set of records retrieved from a database, wherein each record from the result set comprises an identifying word group corresponding to the invented part of speech; and
   (d) for each record in a subset of records from the result set, determining via the computer a match score based on a relevant part of speech score from the previously calculated set of part of speech scores, wherein the relevant part of speech score corresponds to the identifying word group from the record in the subset of records for which the match score is being determined; and
   wherein the cardinality of the subset of records is less than or equal to the cardinality of the set of records from the result set;
   wherein calculating the set of part of speech scores for the input string comprises, for each word group from the set of word groups from the dictionary list, calculating a cosine similarity measure between:
   (A) a first word group corresponding to the input word group corresponding to the invented part of speech; and
   (B) a second word group corresponding to the word group from the set of word groups from the dictionary list;
   wherein the cosine similarity measure is weighted by exponentially increasing the weight given to the similarity of words as those words approach the end of the first word group and the second word group.

14. The method of claim 13, wherein calculating the set of part of speech scores for the input string comprises:
   (a) defining the first word group by reordering the input word group by moving any grouping words from the input word group to the beginning of the input word group;
   (b) defining the second word group by reordering the word group from the set of word groups from the dictionary list by moving any grouping words from the word group from the set of word groups from the dictionary list to the beginning of the word group from the set of word groups from the dictionary list.

15. The method of claim 13, wherein calculating the set of part of speech scores for the input string comprises:
   (a) defining the first word group by deleting any grouping words from the input word group; and
   (b) defining the second word group by deleting any grouping words from the word group from the set of word groups from the dictionary list.

* * * * *